(12) United States Patent
Liao

(10) Patent No.: US 12,143,857 B2
(45) Date of Patent: *Nov. 12, 2024

(54) COMMUNICATION DEVICE AND ASSOCIATED CONTROL METHOD

(71) Applicant: Realtek Semiconductor Corp., HsinChu (TW)

(72) Inventor: Chien-Hung Liao, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 363 days.

This patent is subject to a terminal disclaimer.

(21) Appl. No.: 17/692,102

(22) Filed: Mar. 10, 2022

(65) Prior Publication Data

US 2022/0330091 A1    Oct. 13, 2022

(30) Foreign Application Priority Data

Apr. 8, 2021 (TW) .................................. 110112729

(51) Int. Cl.
*H04W 28/082* (2023.01)
*H04W 24/10* (2009.01)
*H04W 28/08* (2023.01)

(52) U.S. Cl.
CPC ......... *H04W 28/082* (2023.05); *H04W 24/10* (2013.01); *H04W 28/0967* (2020.05)

(58) Field of Classification Search
CPC ............... H04W 28/082; H04W 24/10; H04W 28/0967; H04W 24/02; H04W 24/00;

(Continued)

(56) References Cited

U.S. PATENT DOCUMENTS 7,039,417 B2    5/2006 Lyle
2008/0159210 A1*   7/2008 Zaks .................. H04W 72/563
                                                       370/252

(Continued)

FOREIGN PATENT DOCUMENTS

CN         1860739 A     11/2006
CN       101790172 A      7/2010

(Continued)

OTHER PUBLICATIONS

Office action mailed/issued on Nov. 16, 2023 for CN application No. 202110403294.2, filing date: Apr. 14, 2021, pp. 1-9. ,Nov. 16, 2023.

*Primary Examiner* — Mohamed A Kamara
(74) *Attorney, Agent, or Firm* — Winston Hsu

(57) ABSTRACT

The present invention provides a control method of a communication device, wherein the control method includes the steps of: controlling a wireless communication module of the communication device to use a first channel to communicate with an access point; detecting a plurality of channels to generate a plurality of first quality parameters, respectively, to generate a first channel detection result; receiving a second channel detection result from the access point, wherein the second channel detection result comprises a plurality of second quality parameters respectively generated by the access point detecting at least part of the plurality of channels; calculating a plurality of final quality parameters according to the first channel detection result and the second channel detection result; and determining whether to control the wireless communication module to switch from the first channel to a second channel according to the plurality of final quality parameters.

15 Claims, 5 Drawing Sheets

(58) Field of Classification Search
CPC ..... H04W 24/08; H04W 84/00; H04W 84/18; H04W 88/08
See application file for complete search history.

(56) References Cited

U.S. PATENT DOCUMENTS

| | | | | |
|---|---|---|---|---|
| 2011/0152970 | A1* | 6/2011 | Jollota | H04L 67/12 |
| | | | | 342/357.55 |
| 2021/0377115 | A1* | 12/2021 | Eryigit | H04L 41/14 |
| 2022/0361073 | A1* | 11/2022 | Liao | H04W 36/165 |
| 2024/0107568 | A1* | 3/2024 | Bandaru | H04W 72/0453 |

FOREIGN PATENT DOCUMENTS

| | | |
|---|---|---|
| CN | 101790172 B | 1/2013 |
| CN | 105898877 A | 8/2016 |
| CN | 103583076 B | 1/2018 |

* cited by examiner

COMMUNICATION DEVICE AND ASSOCIATED CONTROL METHOD

BACKGROUND OF THE INVENTION

1. Field of the Invention

The present invention relates to a communication device.

2. Description of the Prior Art

In an access point (AP) or a router, an auto channel selection (ACS) mechanism is executed when the device is powered on to select a better channel for subsequent wireless communication. However, because the ACS mechanism is only executed when the access point or router is powered on, and the access point or router does not restart frequently after it is powered on, the access point or router usually uses the same channel for wireless communication. Therefore, if the surrounding environment of the access point or router changes, it is very likely that the signal quality of this channel will deteriorate. At this time, the access point or router has no mechanism to choose another channel for the wireless communication, and the performance of the access point or router will be worsened and cannot be improved immediately.

In a wireless mesh network system that includes a plurality of access points, each access point must use the same channel for connection and communication. However, since the access points have different interferences due to different locations, such as wall or furniture barriers, the channels used by the wireless mesh network system may be poor for some access points, resulting in a decrease in overall communication quality.

SUMMARY OF THE INVENTION

It is therefore an objective of the present invention to provide a communication device, which can perform channel detection to determine the quality of each channel when the communication device is communicating with other devices, and a channel suitable for all the access points in the wireless mesh network system is determined according to the channel quality of each access point, for the communication device to determine if switching to a better channel for the wireless communication, to solve the problems described in the prior art.

In one embodiment of the present invention, a control method of a communication device comprises the steps of: controlling a wireless communication module of the communication device to use a first channel to communicate with an access point; detecting a plurality of channels to generate a plurality of first quality parameters, respectively, to generate a first channel detection result, wherein the plurality of channels comprise the first channel; receiving a second channel detection result from the access point, wherein the second channel detection result comprises a plurality of second quality parameters respectively generated by the access point detecting at least part of the plurality of channels; calculating a plurality of final quality parameters of the at least part of the plurality of channels according to the first channel detection result and the second channel detection result; and determining whether to control the wireless communication module to switch from the first channel to a second channel according to the plurality of final quality parameters, to communicate with the access point.

In one embodiment of the present invention, a communication device comprising a wireless communication module, a processor and a channel detection module is disclosed. The processor is configured to control the wireless communication module to use a first channel to communicate with an access point. The channel detection module is configured to detect a plurality of channels to generate a plurality of first quality parameters, respectively, to generate a first channel detection result, wherein the plurality of channels comprise the first channel. In addition, the processor receives a second channel detection result from the access point, wherein the second channel detection result comprises a plurality of second quality parameters respectively generated by the access point detecting at least part of the plurality of channels; and the processor calculates a plurality of final quality parameters of the at least part of the plurality of channels according to the first channel detection result and the second channel detection result, and determines whether to control the wireless communication module to switch from the first channel to a second channel according to the plurality of final quality parameters, to communicate with the access point.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
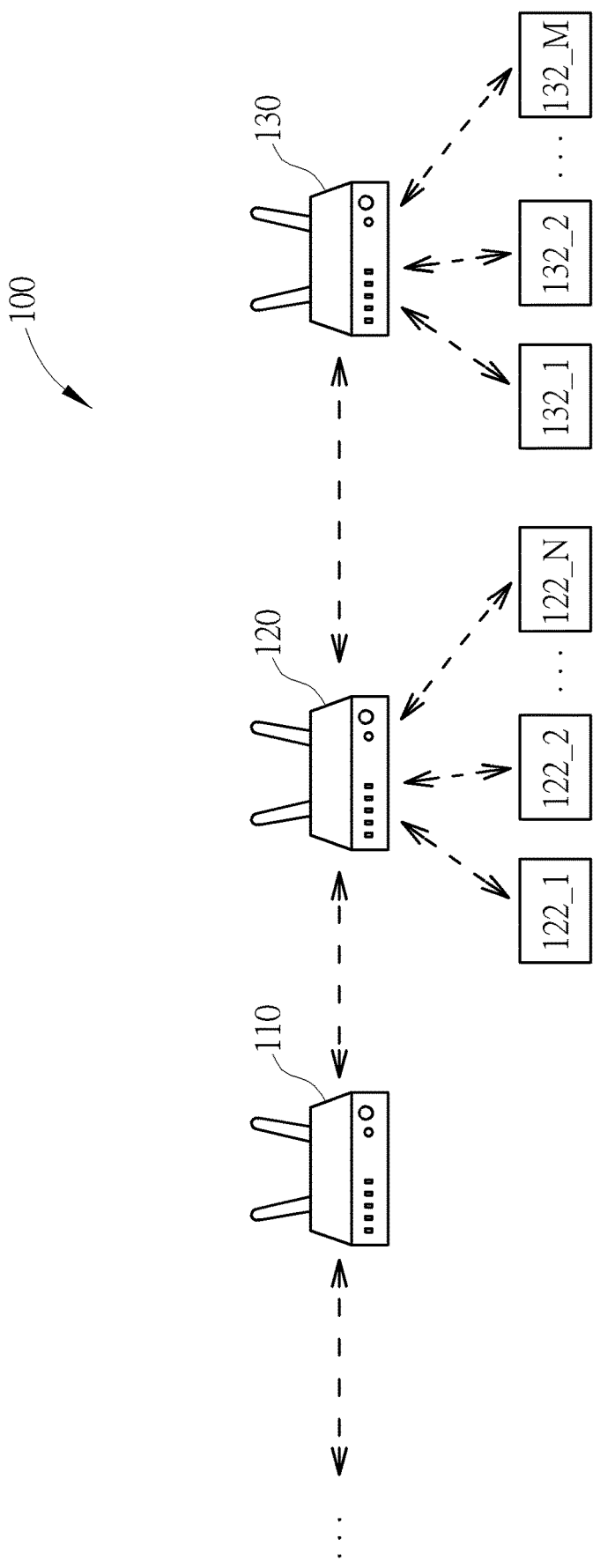
FIG. 1 is wireless mesh network system according to one embodiment of the present invention.

FIG. 1 is wireless mesh network system 100 according to one embodiment of the present invention. As shown in FIG. 1, the wireless mesh network system 100 comprises a plurality of access points, wherein each access point can communicate with one or more terminal devices via wireless network (Wi-Fi) or wired network (Ethernet). In the embodiment shown in FIG. 1, the wireless mesh network system 100 comprises three access points 110, 120 and 130, wherein the access point 120 connects to the terminal devices 122_1-122_N via the wireless or wired network, and the access point 130 connects to the terminal devices 132_1-132_M via the wireless or wired network.

In the wireless mesh network system 100, each of the access points 110, 120 and 130 has the same service set identifier (SSID), and use the same channel (Wi-Fi channel) when using wireless communication. In this embodiment, the access point 110 serves as a control device, that is, the access point 110 is directly connected to a wide area network (WAN), and the access points 120 and 130 and the terminal devices 122_1-122_N and 132_1-132_M all need to communicate with the WAN via the access point 110. In addition, the access points 110, 120 and 130 shown in FIG. 1 are connected with a daisy chain, that is, the access point 130 needs to pass through the access point 120 to communicate with the access point 110. However, the daisy chain connection is only an example, not a limitation of the present invention. In other embodiments, the access points 110, 120 and 130 can be connected with a star network, that is, the access points 120 and 130 can be directly connected to the access point 110.

Each of the access points 110, 120 and 130 has its own effective signal transmission range, and because the locations of the access points 110, 120 and 130 are not the same, the interference of the access point 110, 120 and 130 are not the same. For example, suppose that all devices in the wireless mesh network system 100 use Wi-Fi channel '40' to communicate, and there are other electronic devices that are not part of the mesh wireless network system 100 around the access point 130 and using Wi-Fi channel '40' for high-traffic transmission, at this time, the communication quality of the access point 130 will be disturbed and its throughput will be reduced. In order to solve the above-mentioned problem, this embodiment proposes a control method, which can determine an optimal channel suitable for the wireless mesh network system 100 according to the channel quality detected by each access point.

Figure 2:
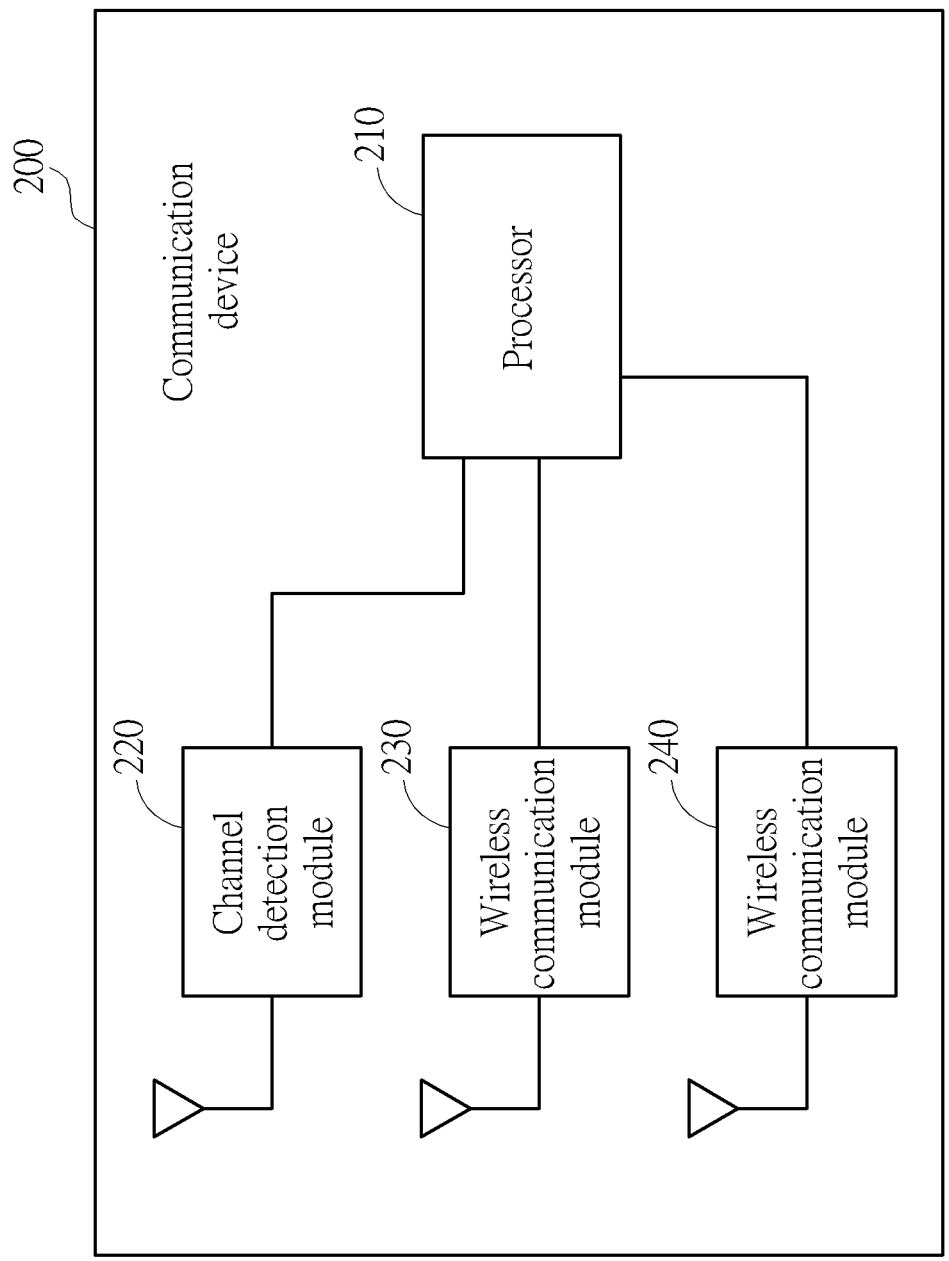
FIG. 2 is a communication device according to one embodiment of the present invention.

FIG. 2 is a diagram illustrating a communication device 200 according to one embodiment of the present invention. As shown in FIG. 2, the communication device 200 comprises a processor 210, a channel detection module 220 and two wireless communication modules 230 and 240. In this embodiment, the communication device 200 is an access point or a router, and the wireless communication module 230 is used to transmit and receive signals in 2.4 GHz channels, and the wireless communication module 240 is used to transmit and receive signals in 5 GHz channels.

In the operation of the communication device 200, when the communication device 200 is powered on and has used one or two channels determined by the wireless mesh network system 100, the processor 210 will control the wireless communication module 230 to use the determined channel for wireless communication, or control the wireless communication module 240 to use the determined channel for wireless communication; or the processor 210 will control the wireless communication module 230 to use the determined channel for wireless communication, and control the wireless communication module 240 to use another determined channel for wireless communication. After the communication device 200 completes the above operations, the channel detection module 220 starts to perform real-time channel detection to generate channel information, so as to determine the quality of each channel.

Figure 3:
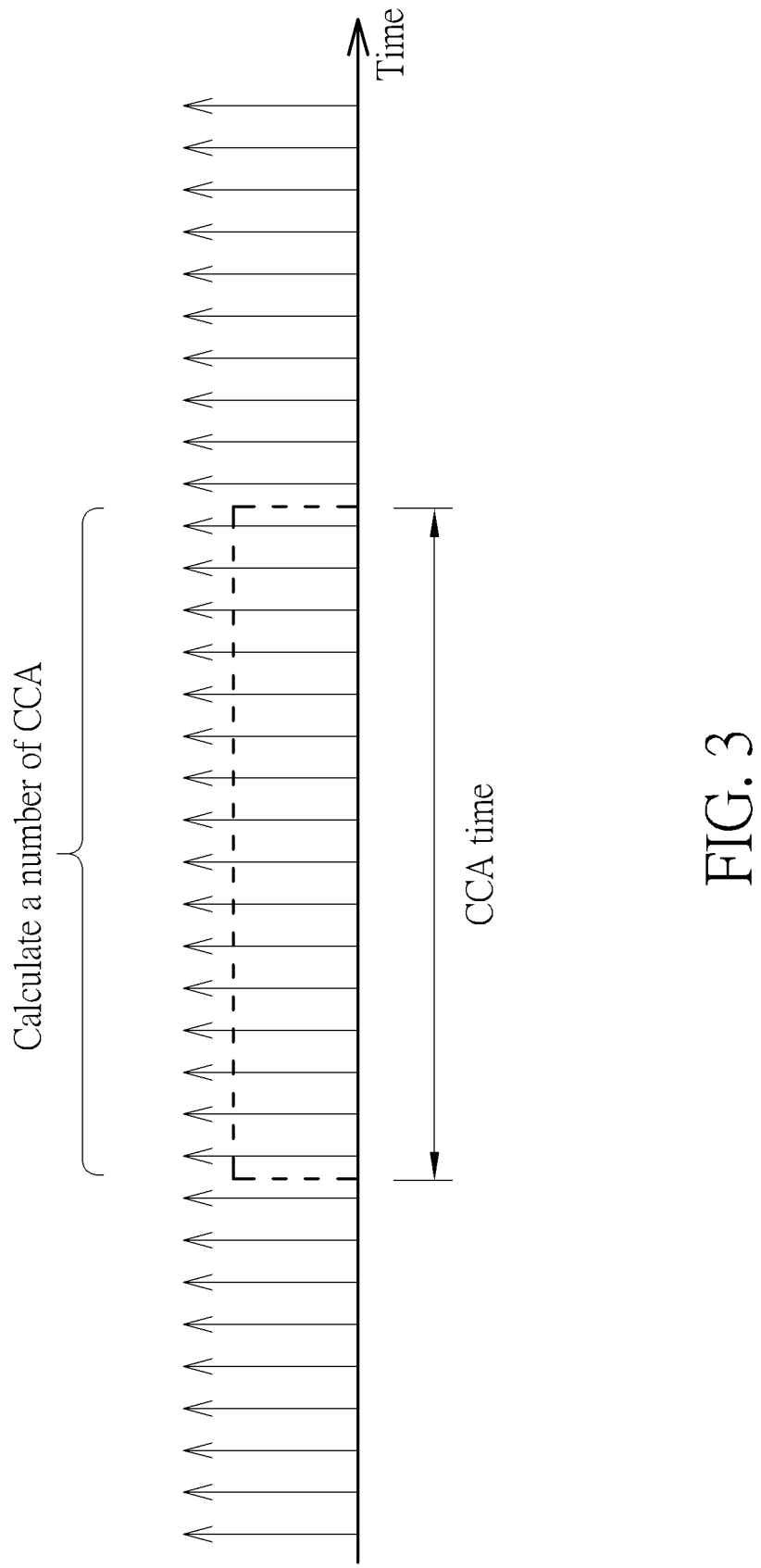
FIG. 3 a diagram of a channel load measurement.
Figure 4:
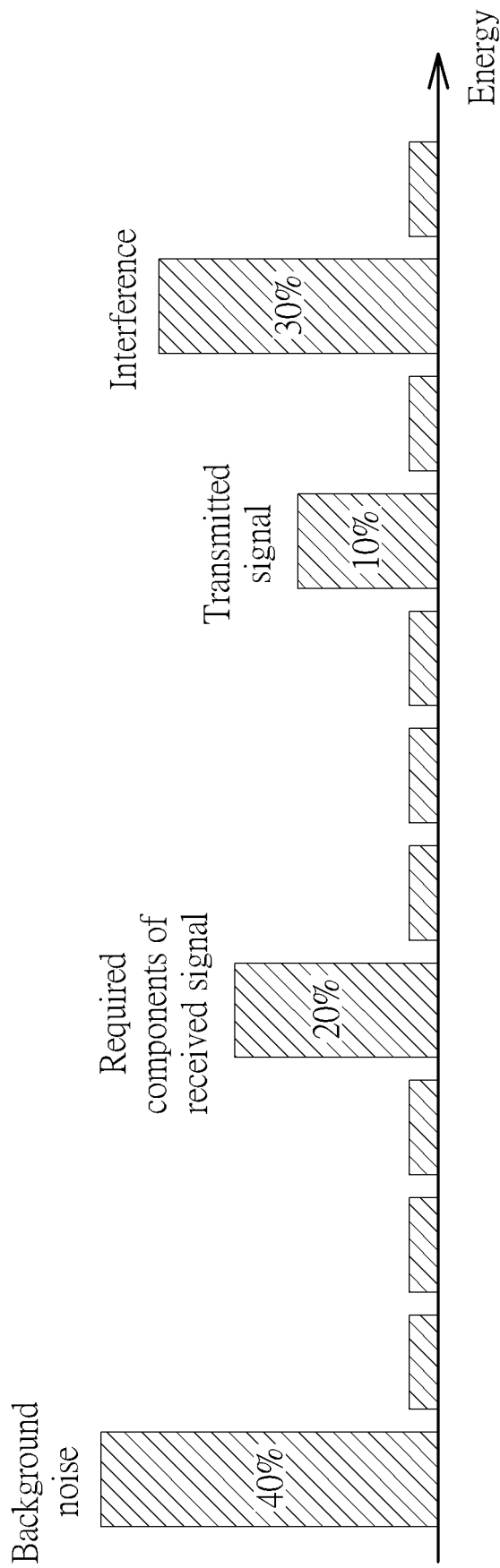
FIG. 4 is a diagram of noise histogram measurement.

Specifically, the channel detection module 220 may have a dedicated antenna, so that when the wireless communication module 230 and the wireless communication module 240 are operating, the channel information of each channel can still be detected. In one embodiment, the channel detection module 220 may be a wireless communication module, and its structure may be similar to the wireless communication modules 230 and 240. In the operation of the channel detection module 220, the channel detection module 220 will periodically detect each channel to generate corresponding channel information, for example, the channel detection module 120 receives the signal of each channel every 30 seconds to generate corresponding channel information. It should be noted that since the channel detection module 220 receives the signal passively, "each channel" mentioned above refers to the channel signal that the channel detection module 220 can receive. For example, the channel detection module 220 can detect each channel by using a channel load measurement (CLM) and/or a noise histogram measurement (NHM). The channel load measurement method can refer to FIG. 3, that is, for each channel, the channel detection module 220 calculates a number of channel idle times or an idle time during a clear channel assessment (CCA) time to determine a percentage of time that the communication device 200 can actually receive packets. The noise histogram measurement method can refer to FIG. 4, which comprises the energy ratio of the content received by a channel in a period of time, such as background noise, required components of received signal, transmitted signal, interference signals, . . . etc. from different sources. In the above example, because the channel load measurement can determine the proportion of time that the communication device 200 can actually receive packets when the channel is used, it can accurately reflect whether there are other devices around the communication device 200 use this channel or a similar frequency band (for example, 2.492 GHz-2.480 GHz used by Bluetooth devices). In addition, because the noise histogram measurement can detect environmental noise, it can accurately reflect whether there is a microwave oven or other microwave devices operating around the communication device 200. As mentioned above, the above two channel information can accurately reflect the quality of the channel.

Then, after the channel information of each channel is generated, the channel detection module 220 can determine the quality of each channel according to the channel information. For example, the channel detection module 220 can calculate the quality parameters of some channels as shown in Table 1 below.

TABLE 1

| channel | Quality parameter (%) | CLM (%) | NHM (%) |
|---|---|---|---|
| 36 | 77 | 26 | 20 |
| 40 | 67 | 16 | 50 |
| 44 | 62 | 39 | 39 |
| 48 | 56 | 35 | 54 |
| 52 | 59 | 64 | 30 |
| 56 | 66 | 80 | 12 |
| 60 | 68 | 74 | 12 |
| 64 | 54 | 92 | 0 |
| 100 | 86 | 13 | 16 |
| 104 | 75 | 19 | 33 |
| 108 | 74 | 26 | 26 |
| 112 | 66 | 39 | 31 |
| 116 | 65 | 16 | 54 |
| 120 | 69 | 11 | 52 |
| 124 | 72 | 25 | 33 |
| 128 | 60 | 28 | 52 |
| 132 | 70 | 11 | 50 |

It should be noted that Table 1 is for illustrative purpose only. In practice, the channel detection module 220 can generate more different channel information for use in generating quality parameters, and different weights can be set for different channel information to calculate the quality parameters.

In light of above, each of the access points periodically determines the quality parameter of each channel. After the quality parameter of each channel is determined, the access point 110 serving as the control device will obtain the quality parameters calculated by each access point, that is, the access point 120 will transmit the quality parameters of the channels calculated by itself to the access point 110, and the access point 130 will also transmit the quality parameters of the channels calculated by itself to the access point 110 through the access point 120. For example, the quality parameters of some channels obtained by the access point 110 are shown in Table 2 below.

TABLE 2

| channel | Quality parameter calculated by the access point 110 | Quality parameter calculated by the access point 120 | Quality parameter calculated by the access point 130 |
|---|---|---|---|
| 36 | 10 | 20 | 15 |
| 40 | 20 | 15 | 15 |
| 44 | 30 | 15 | 18 |
| 48 | 20 | 25 | 30 |
| 149 | 10 | 30 | 44 |
| 153 | 20 | 22 | 25 |
| 157 | 30 | 27 | 20 |
| 161 | 15 | 30 | 25 |

After obtaining the channel quality parameters of other access points, the access point 110 can perform calculations based on these channel quality parameters, such as average calculation, weighted summation, weighted average, etc., to calculate the final quality parameters of each channel, for determining an optimal channel suitable for wireless mesh network system 100.

In one embodiment, the access point 110 can obtain the connection information of other access points 120 and 130, and calculate the weight of each access point based on the connection information, and the weights of the access points are used to calculate the final quality parameter of each channel. For example, suppose that the weights of the access points 110, 120 and 130 are W1, W2 and W3, respectively, and the quality parameters corresponding to a specific channel calculated by the access points 110, 120 and 130 are Q1, Q2 and Q3, respectively, the final quality parameter of of the specific channel can be calculated as follows:

$$Qf=(Q1*W1+Q2*W2+Q3*W3)/(W1+W2+W3) \quad (1).$$

For example, the final quality parameters of some channels calculated by the access point 110 are shown in Table 3 below.

TABLE 3

| channel | Final quality parameter |
|---|---|
| 36 | 16.3 |
| 40 | 21.3 |
| 44 | 28.5 |
| 48 | 27.9 |
| 149 | 26.2 |
| 153 | 25.8 |
| 157 | 32.7 |
| 161 | 25.0 |

Regarding the calculation of the weight of each of the access point 110, 120 and 130, the access point 110 serving as the control device can calculate the weight of each of the access point 110, 120 and 130 according to the identity of each of the access point 110, 120 and 130, (for example, whether it is a control device), the number of terminal devices connected via wireless network, the number of terminal devices connected via Ethernet, how many access points are assisted to send data to access point 110 (control device), and/or user-defined weight . . . etc.

For example, the access point 110 serving as the control device can add '3' to the weight, while the other access points 120 and 130 add '1' to the weight. When the number of terminal devices connected via wireless network is less than '3', the weight is increased by '0'; and when the number of terminal devices connected via wireless network is between '3'-'8', the weight is increased by '0.25'. When the number of terminal devices connected to the wireless network is greater than '8', the weight is increased by '0.5'. When the number of terminal devices connected via Ethernet is greater than '0' and less than or equal to '3', the weight is increased by '0.2'; and when the number of terminal devices connected via Ethernet is greater than '3', The weight is increased by '0.4'. Regarding how many access points are assisted to send data to the access point 110 (control device), since the access point 120 assists the access point 130 to send data to the access point 110, the access point 120 needs to additionally add the weight calculated by the access point 130 based on the connected terminal device. For example, suppose the weights calculated by the access points 120 and 130 based on the connected terminal devices is 0.2 and 0.3, respectively, the weight, corresponding to the connected terminal device, of the access point 120 is '0.5' (i.e. 0.2+0.3=0.5). The user can also sort the importance of the access points 110, 120 and 130 through a terminal device. For example, the user can add '1.7', '1.2' and '1.2' to the weights of the access points 110, 120 and 130, respectively.

It should be noted that the above-mentioned calculation method of weight is only for illustration, and is not a limitation of the present invention. In other embodiments, the weight calculation of the access points 110, 120 and 130 may additionally consider other information of the access point, such as hop count or packet transmission path.

After calculating the final quality parameters, the processor 210 of the access point 110 serving as the control device determines whether the final quality parameter of the channel currently used by the wireless communication module 230 or the wireless communication module 240 is lower than the final quality parameters of other channels to determine whether to switch the wireless communication module 230 or the wireless communication module 240 to another channel. For example, assuming that the wireless communication module 240 is using channel '149' to communicate with other wireless devices, and the processor 210 determines that the channel '153' has the best final quality parameter, the access point 110 can notify the other access points 120 and 130 to switch to the channel '153', and control the wireless communication module 240 to switch to the channel '153' at appropriate time, for the communication with other wireless devices (i.e., the access points 120 and 130). In addition, since the channel switching operation of the communication device 200 can be obtained by referring to the content of the IEEE 802.11k specification, the relevant details will be omitted here.

It is noted that since the final quality parameter is obtained by considering the quality parameters of all the access points 110, 120 and 130, the channel with the best final quality parameter may be different from the channel with best quality parameter determined by the access point 110 itself.

It should be noted that the mechanism for the access point 110 to determine whether to switch the currently used channel to another channel may have the following other implementations. First, since the access points 110, 120 and 130 require a more complicated process when performing channel switching, the access point 110 may notify the access points 120 and 130 to perform the channel switching operation only when the final quality parameter of the channel currently used by the access point 110 is lower than a threshold value. Second, the access point 110 may notify the access points 120 and 130 to perform the channel switching operation only when a difference between the final quality parameter of the channel currently used by the access point 110 and an optimal final quality parameter is greater than a threshold value. Third, the access point 110 determines whether the wireless communication module 230 or the wireless communication module 240 is currently performing massive or continuous data transmission with other wireless devices, and the access point 110 does not perform channel switching operation if the wireless communication module 230 or the wireless communication module 240 is busy.

In another embodiment, one of the wireless communication module 230 and the wireless communication module 240 can be removed from the communication device 200 without affecting the spirit of the present invention.

In another embodiment, when the access point 110 determines that a better channel is currently available for the wireless communication module 230 or the wireless communication module 240, the processor 210 of the access point 110 first transmits the channel switching information of the wireless communication module 230 or the wireless communication module 240 to the user/manager for reference, without directly performing channel switching operation. In addition, the user can determine if controlling the access point 110 to switch the channel according to the channel switching information from the access point 110.

Figure 5:
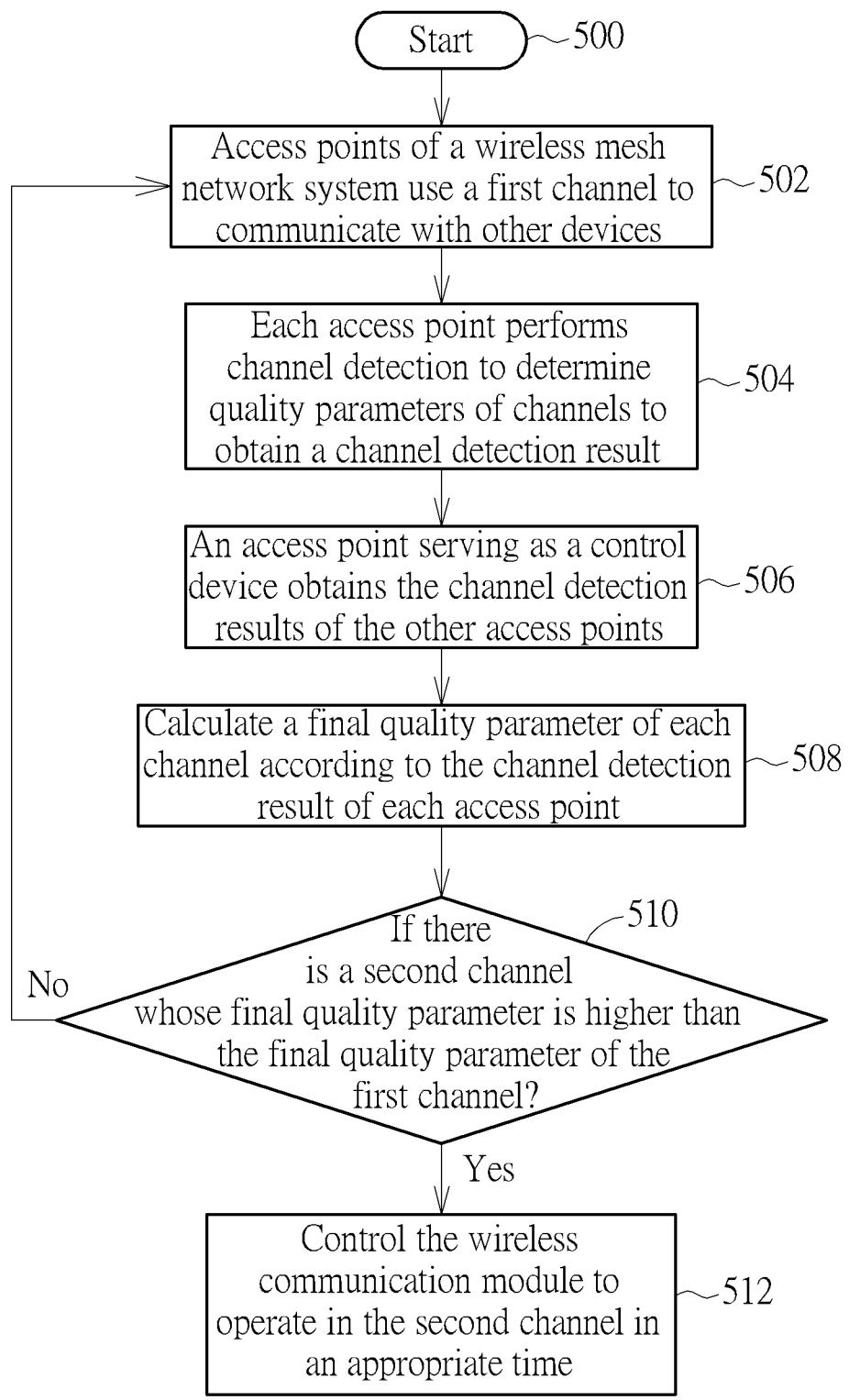
FIG. 5 is a flowchart of a control method of a communication device according to one embodiment of the present invention.

FIG. 5 is a flowchart of a control method of a communication device according to one embodiment of the present invention. Referring to the above embodiments, the flow of the control method is as follows.

Step 500: the flow starts.

Step 502: access points of a wireless mesh network system use a first channel to communicate with other devices.

Step 504: each access point performs channel detection to determine quality parameters of channels to obtain a channel detection result.

Step 506: an access point serving as a control device obtains the channel detection results of the other access points.

Step 508: calculate a final quality parameter of each channel according to the channel detection result of each access point.

Step 510: determine if there is a second channel whose final quality parameter is higher than the final quality parameter of the first channel.

Step 512: control the wireless communication module to operate in the second channel in an appropriate time.

Briefly summarized, in the communication device and associated control method of the present invention, since the final quality parameter of each channel calculated by the access point serving as the control device is obtained based on the channel detection result of each access point, so the determined optimal channel can accurately reflect the overall factors of the wireless mesh network system. Therefore, the present invention can ensure that the wireless mesh network system always uses a channel with better quality to communicate with other wireless devices, so as to improve the overall communication quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a communication device, comprising:

controlling a wireless communication module of the communication device to use a first channel to communicate with an access point;

detecting a plurality of channels to generate a plurality of first quality parameters, respectively, to generate a first channel detection result, wherein the plurality of channels comprise the first channel;

receiving a second channel detection result from the access point, wherein the second channel detection result comprises a plurality of second quality parameters respectively generated by the access point detecting at least part of the plurality of channels;

calculating a plurality of final quality parameters of the at least part of the plurality of channels according to the first channel detection result and the second channel detection result; and determining whether to control the wireless communication module to switch from the first channel to a second channel according to the plurality of final quality parameters, to communicate with the access point.

2. The control method of claim 1, wherein the step of detecting the plurality of channels to generate the plurality of first quality parameters is performed when the wireless communication module is using the first channel.

3. The control method of claim 1, wherein the step of determining whether to control the wireless communication module to switch from the first channel to a second channel according to the plurality of final quality parameters comprises:

determining if the plurality of channels have the second channel whose final quality parameter is higher than the final quality parameter of the first channel; and if the plurality of channels have the second channel whose final quality parameter is higher than the final quality parameter of the first channel, selectively controlling the wireless communication module to use the second channel to communicate with the access point.

4. The control method of claim 1, wherein the step of calculating the plurality of final quality parameters of the at least part of the plurality of channels according to the first channel detection result and the second channel detection result comprises:

for each of the plurality of channels, performing a weighted calculation on the first quality parameter and the second quality parameter of the channel to obtain the final quality parameter of the channel.

5. The control method of claim 4, further comprising:

calculating weights of the communication device and the access point according to identities of the communication device and the access point, a number of terminal devices that the communication device is connected to through a wireless network, a number of terminal devices that the access point is connected to through the wireless network, a number of terminal devices that the communication device is connected to through Ethernet, a number of terminal devices that the access point is connected to through Ethernet, how many access points are assisted to send data to a control device, and/or user-defined weights.

6. The control method of claim 1, wherein the step of detecting a plurality of channels to generate the plurality of first quality parameters, respectively, comprises:

performing a channel load measurement (CLM) and/or a noise histogram measurement (NHM) on each of the plurality of channels; and calculating the first quality parameter of each channel based on results of the channel load measurement and/or the noise histogram measurement.

7. The control method of claim 1, wherein the step of detecting a plurality of channels to generate the plurality of first quality parameters, respectively, comprises:
when the wireless communication module is using the first channel, using a channel detection module different from the wireless communication module to detect the plurality of channels to generate the plurality of first quality parameters, respectively.

8. The control method of claim 1, wherein the communication device and the access point are within a wireless mesh network system, and the communication device is a control device of the wireless mesh network system.

9. A communication device, comprising:
a wireless communication module;
a processor, configured to control the wireless communication module to use a first channel to communicate with an access point; and
a channel detection module, configured to detect a plurality of channels to generate a plurality of first quality parameters, respectively, to generate a first channel detection result, wherein the plurality of channels comprise the first channel;
wherein the processor receives a second channel detection result from the access point, wherein the second channel detection result comprises a plurality of second quality parameters respectively generated by the access point detecting at least part of the plurality of channels; and the processor calculates a plurality of final quality parameters of the at least part of the plurality of channels according to the first channel detection result and the second channel detection result, and determines whether to control the wireless communication module to switch from the first channel to a second channel according to the plurality of final quality parameters, to communicate with the access point.

10. The communication device of claim 9, wherein the channel detection module detects the plurality of channels to generate the plurality of first quality parameters when the wireless communication module is using the first channel.

11. The communication device of claim 9, wherein the processor determines if the plurality of channels have the second channel whose final quality parameter is higher than the final quality parameter of the first channel; and if the plurality of channels have the second channel whose final quality parameter is higher than the final quality parameter of the first channel, the processor selectively controls the wireless communication module to use the second channel to communicate with the access point.

12. The communication device of claim 9, wherein for each of the plurality of channels, the processor performs a weighted calculation on the first quality parameter and the second quality parameter of the channel to obtain the final quality parameter of the channel.

13. The communication device of claim 12, wherein the processor calculates weights of the communication device and the access point according to identities of the communication device and the access point, a number of terminal devices that the communication device is connected to through a wireless network, a number of terminal devices that the access point is connected to through the wireless network, a number of terminal devices that the communication device is connected to through Ethernet, a number of terminal devices that the access point is connected to through Ethernet, how many access points are assisted to send data to a control device, and/or user-defined weights.

14. The communication device of claim 9, wherein the channel detection module performs a channel load measurement (CLM) and/or a noise histogram measurement (NHM) on each of the plurality of channels, and calculates the first quality parameter of each channel based on results of the channel load measurement and/or the noise histogram measurement.

15. The communication device of claim 9, wherein the communication device and the access point are within a wireless mesh network system, and the communication device is a control device of the wireless mesh network system.

* * * * *